UNITED STATES PATENT OFFICE.

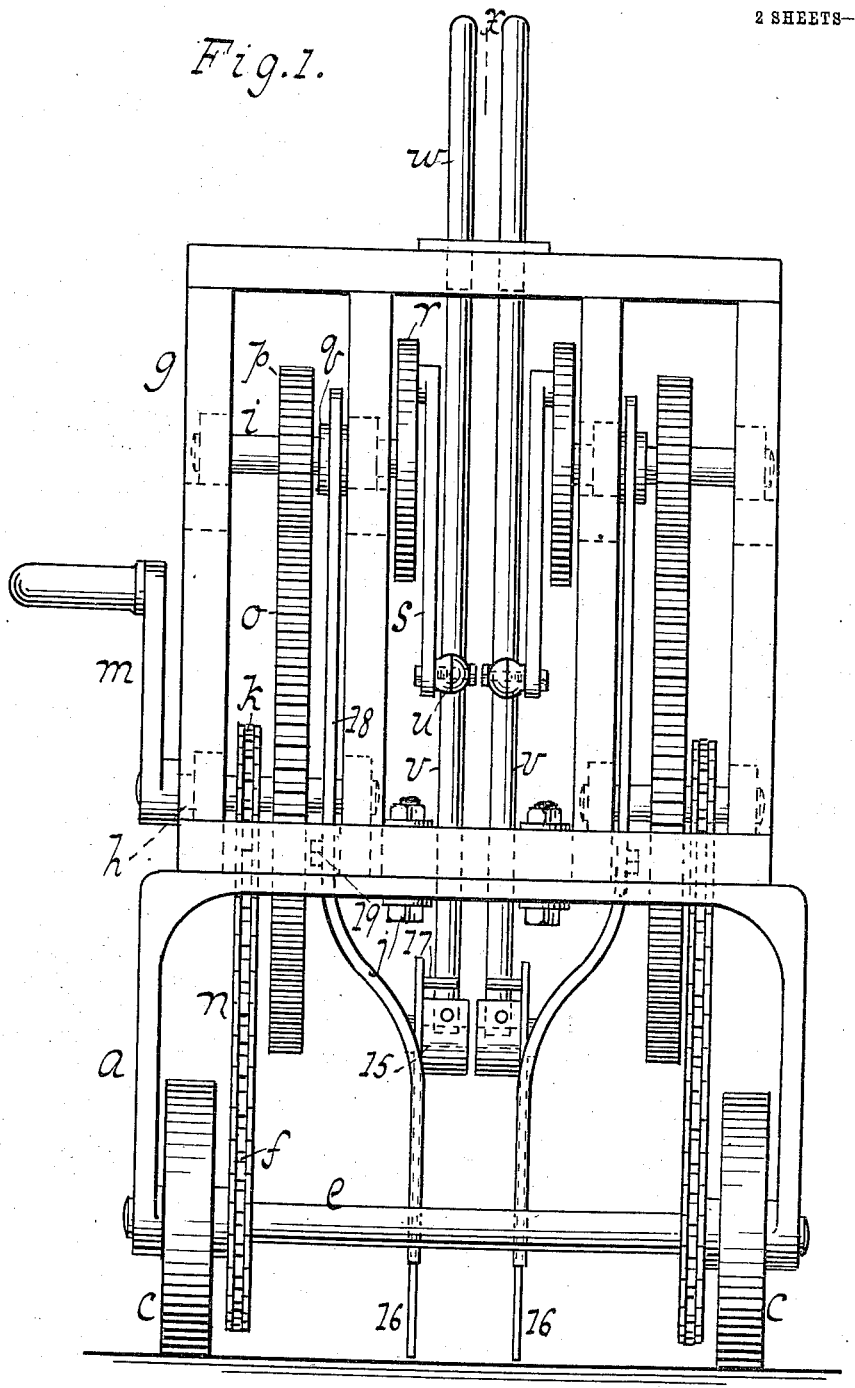

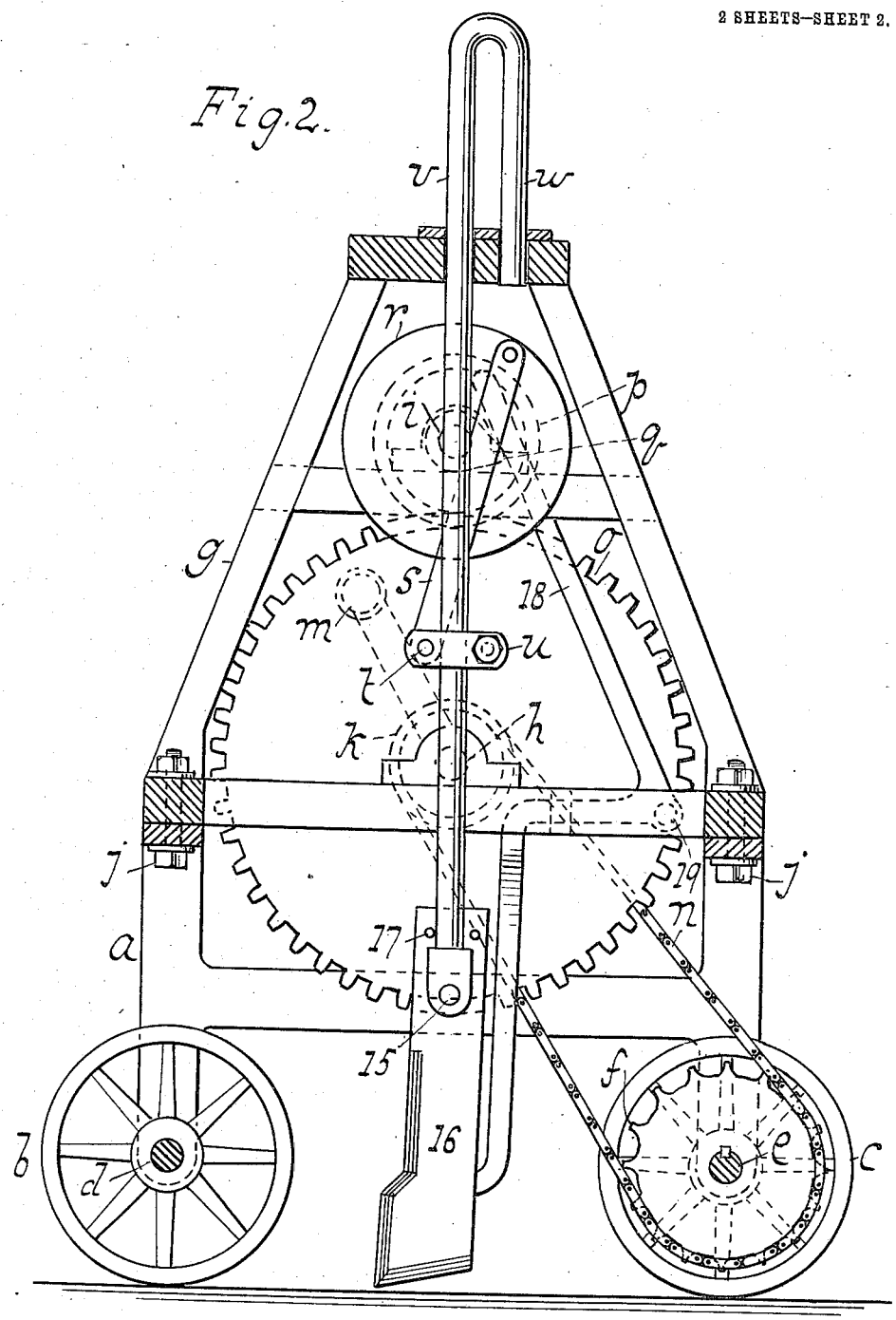

JOHN LAPIN, OF BROOKLYN, NEW YORK.

TRENCH-DIGGING MACHINE.

1,092,777. Specification of Letters Patent. Patented Apr. 7, 1914.

Application filed April 11, 1913. Serial No. 760,558.

*To all whom it may concern:*

Be it known that I, JOHN LAPIN, a subject of the Czar of Russia, residing at Brooklyn, county of Kings, State of New York, have invented new and useful Improvements in Trench-Digging Machines, of which the following is a specification.

This invention relates to a machine for digging trenches in which the driving mechanism for propelling the carriage transmits reciprocating movement to an implement adapted to excavate the soil. The cutting implement is rockingly mounted on the carriage, and it is actuated when out of action or free of the soil to swing forward at an inclination toward the direction of movement of the carriage so as to give a slanting cut into the earth. Consequently by the forward movement of the carriage, the implement while in the earth will swing backward to its initial position, and thus be ready when again rocked forward for its next stroke into the earth. The implement is given accelerated reciprocating movement by being geared directly to the driving shaft and it is adapted to cut an uninterrupted channel in the soil parallel to the movement of the carriage.

One of the objects of the invention is to provide a machine capable of being propelled to any locality and of suitable construction for cutting into and loosening any kind of earth so that a trench can be readily dug.

The other objects and novel details of the invention are more fully described in the following specification and claims and illustrated in the accompanying drawings in which:

Figure 1 represents a rear elevation of a machine embodying this invention. Fig. 2 is a vertical section taken along the line $xx$ of the same.

Referring to the drawings a carriage is shown consisting of a frame $a$ having forward wheels $b$ and rear wheels $c$. The forward wheels can revolve loosely on a shaft or axle $d$ while the rear traction or propelling wheels $c$ are fixed to a transmission shaft $e$ both shafts preferably extending across the carriage. Both these shafts serve to mount the frame $a$ described above. The shaft $e$ carries one or any number of sprocket gears $f$ for rotating the shaft.

On the frame $a$ is mounted a supplemental frame $g$ carrying a main driving shaft $h$ and a countershaft $i$ arranged above the main shaft. The frame $g$ is removably attached to the carriage frame by means of bolts $j$. When it is necessary to transport the machine the upper frame with its mechanism can be removed from the carriage. The driving shaft $h$ is provided with one or more pinions $k$ and it has an actuator such as a crank $m$ for operating the shaft. This shaft may be connected to a motor or other source of mechanical power for driving the shaft. The said pinion $k$ has chain or belt connection $n$ with the sprocket gear $f$ on the transmission shaft. A large gear $o$ transmits motion from the driving shaft $h$ to a gear $p$ secured to the countershaft. The countershaft $i$ carries a cam $q$ and a balance crank wheel or crank $r$ both being fixed to the shaft. The crank wheel has one end of a link $s$ pivoted to it while the other end of the link is pivoted at $t$ to a coupling $u$. This coupling is attached to a bar $v$ the upper portion of which has a leg $w$ guided in the top of the frame. The leg prevents twisting or turning movement of the bar and thus guides the bar up and down in a straight line. The connection $u$ noted above is adjustable along the bar so that the throw of the bar can be varied. To the lower portion of the bar $v$ is pivoted at 15 a blade or other implement 16 for cutting a groove into the soil. Studs or stops 17 located at the upper portion of the blade limit the rocking movement of the blade in its relation to the bar. Any number of these cutting implements may be arranged in a row and mounted on the machine and motion transmitted to them from the shaft $e$ by means of the driving shaft $h$. The cam $q$ on the countershaft operates a lever 18 fulcrumed at 19 to the frame. The lower portion of this lever is shaped to counterbalance the top no springs being necessary to hold the top portion against the face of the cam. The lower end of the lever co-acts with the rear portion of the blade and at predetermined times rocks the same.

When the driving shaft $h$ is operated the traction or propelling wheels co-acting with the ground or a pair of tracks move the carriage forward, and the blade through the medium of the crank wheel connections moves up and down. The blade is rocked by means of the cam and lever when withdrawn from the soil so that the blade will be forced into the earth at a slant in order to insure a continuous cut.

By the forward movement of the carriage, the knife oscillates backward before it is withdrawn from the groove, thus being ready to swing forward by the actuation of the lever for its succeeding stroke into the soil.

The machine is adapted to cut any number of parallel grooves depending upon the number of blades employed, and the driving shaft may be actuated in any well known way.

I claim:

1. A trench digging machine comprising a carriage, a blade swingingly mounted on the carriage, driving devices for propelling the carriage, a crank operated by the driving devices for transmitting reciprocating movement to the blade, a lever actuated by the driving devices for oscillating the blade forward when out of action, said blade being adapted to swing backward by the interrupted actuation of the lever and the forward movement of the carriage.

2. A trench digging machine comprising a carriage, propelling devices including a driving shaft for operating the carriage, a countershaft having a cam and crank actuated by the driving shaft, a link pivoted to the crank, a blade connected to the link, and a lever actuated by the cam for rocking the blade.

3. A trench digging machine comprising a carriage, propelling devices including a driving shaft for operating the carriage, a countershaft having a cam and crank actuated by the driving shaft, a link pivoted to the crank, a blade connected to the link, and a lever actuated by the cam for oscillating the blade forward when out of action.

4. A trench digging machine comprising a carriage, propelling devices including a driving shaft for operating the carriage, a countershaft having a cam and crank actuated by the driving shaft, a link pivoted to the crank, a guide bar coupled to the link, a blade swingingly pivoted to the guide bar, and a lever operated by the cam for oscillating the blade forward when out of action, said blade being adapted to swing backward by the interrupted actuation of the lever and the forward propulsion of the carriage.

In testimony whereof I have hereunto set my hand in the presence of two subscribing witnesses.

JOHN LAPIN.

Witnesses:
CHRIS. H. AHNSTAEDT,
WILLIAM MILLER.

Copies of this patent may be obtained for five cents each, by addressing the "Commissioner of Patents, Washington, D. C."